US010683220B2

(12) United States Patent
Chrisman

(10) Patent No.: US 10,683,220 B2
(45) Date of Patent: Jun. 16, 2020

(54) LIQUID TREATMENT SYSTEMS AND METHODS

(71) Applicant: Tennant Company, Minneapolis, MN (US)

(72) Inventor: Lars R. Chrisman, Gobles, MI (US)

(73) Assignee: Tennant Company, Minneapolis, MN (US)

( * ) Notice: Subject to any disclaimer, the term of this patent is extended or adjusted under 35 U.S.C. 154(b) by 477 days.

(21) Appl. No.: 14/932,029

(22) Filed: Nov. 4, 2015

(65) Prior Publication Data

US 2016/0122212 A1 May 5, 2016

Related U.S. Application Data

(60) Provisional application No. 62/075,061, filed on Nov. 4, 2014.

(51) Int. Cl.
*B01F 5/04* (2006.01)
*B08B 3/08* (2006.01)
(Continued)

(52) U.S. Cl.
CPC .......... *C02F 1/688* (2013.01); *A47L 11/4083* (2013.01); *B01F 5/0498* (2013.01);
(Continued)

(58) Field of Classification Search
None
See application file for complete search history.

(56) References Cited

U.S. PATENT DOCUMENTS 3,104,823 A 9/1963 Hayes
3,195,558 A 7/1965 August et al.
(Continued)

FOREIGN PATENT DOCUMENTS

CN 202542991 U 11/2012
DE 102009017126 A1 4/2011
(Continued)

OTHER PUBLICATIONS

International Search Report and Written Opinion for PCT/US2015/058823; dated Apr. 14, 2016; 19 pages.
(Continued)

*Primary Examiner* — Krishnan S Menon
(74) *Attorney, Agent, or Firm* — Fredrikson & Byron, P.A.

(57) ABSTRACT

A liquid treatment system comprising a main flow path, a bypass flow path fluidly coupled to a main flow path, and a liquid conditioning module fluidly coupled with the bypass flow path with a reservoir holding treatment components added to liquid entering the reservoir from the bypass flow path to form a treatment solution. A flow rate of liquid in the main flow path is controlled independently of a flow rate of treatment solution flowing into the main flow path. A dispensing component fluidly coupled to the liquid conditioning module controls flow rates or pressures of treatment solution flowing out of the bypass flow path and into the main flow path independently of flow rate of liquid flowing in the main flow path. The liquid treatment system comprises a drop tube system suspended in treatment solution having the highest treatment concentration.

20 Claims, 8 Drawing Sheets

(51) Int. Cl.
*C02F 1/00* (2006.01)
*C02F 1/50* (2006.01)
*C02F 1/68* (2006.01)
*C02F 5/08* (2006.01)
*A47L 11/40* (2006.01)

(52) U.S. Cl.
CPC ............ *B08B 3/08* (2013.01); *C02F 1/006* (2013.01); *C02F 1/008* (2013.01); *C02F 1/50* (2013.01); *C02F 1/686* (2013.01); *C02F 5/08* (2013.01); *C02F 1/001* (2013.01); *C02F 1/683* (2013.01); *C02F 2201/006* (2013.01); *C02F 2209/005* (2013.01); *C02F 2209/03* (2013.01); *C02F 2209/40* (2013.01); *C02F 2301/043* (2013.01); *C02F 2303/02* (2013.01); *C02F 2303/04* (2013.01); *C02F 2303/22* (2013.01); *C02F 2307/10* (2013.01); *C02F 2307/12* (2013.01)

(56) References Cited

U.S. PATENT DOCUMENTS

| | | |
|---|---|---|
| 4,548,227 A | 10/1985 | Regunathan et al. |
| 4,908,190 A | 3/1990 | Maglio et al. |
| 5,133,381 A | 7/1992 | Wood et al. |
| 5,143,257 A | 9/1992 | Austin et al. |
| 5,507,945 A | 4/1996 | Hansen |
| 6,123,839 A * | 9/2000 | Sussman ............. C02F 1/008 210/136 |
| 6,241,884 B1 | 6/2001 | Hansen |
| 6,270,664 B1 | 8/2001 | Tsabari |
| 6,464,900 B1 | 10/2002 | Kmec et al. |
| 6,589,461 B2 | 7/2003 | Hansen |
| 7,650,830 B1 | 1/2010 | Lessis |
| 2012/0012188 A1 | 1/2012 | Matheis et al. |

FOREIGN PATENT DOCUMENTS

| | | |
|---|---|---|
| WO | 9420191 A1 | 9/1994 |
| WO | 03055810 A1 | 7/2003 |

OTHER PUBLICATIONS

Partial International Search for PCT/US2015/058823, dated Jan. 29, 2016, 5 pages.

* cited by examiner

US 10,683,220 B2

LIQUID TREATMENT SYSTEMS AND METHODS

RELATED APPLICATIONS

This application claims the benefit of U.S. Provisional Patent Application No. 62/075,061, filed Nov. 4, 2014, the entire contents of which are incorporated herein by reference.

FIELD

The present disclosure relates to liquid treatment systems. More particularly, the present disclosure relates to systems used for the treatment of liquid used surface maintenance machines.

BACKGROUND

Liquid conditioning modules for treating and/or modifying the properties of liquid can be used for liquid treatment in municipal liquid treatment facilities (e.g., water treatment plants) or as part of a home or industrial liquid treatment systems. They are also useful in equipment which uses liquid, such as cleaning equipment. Such liquid conditioning modules may include a solid or liquid treatment component which is added to the liquid for various purposes. For example, the liquid conditioning modules may include various chemical agents (referred to as "treatment components") which are added to the liquid in small amounts in order to control chemical or physical aspects of the liquid, such as liquid hardness or scale.

Known liquid treatment liquid conditioning module systems may not effectively treat the liquid. These problems are particularly evident in applications in which there are variations in liquid conditioning module usage rates, liquid flow velocity and line pressure. In such situations, it can be particularly difficult to maintain consistent and stable treatment component concentration levels. In addition, existing systems have difficulty operating at flow rates which are low enough to provide long lasting and economical liquid treatment, such as for protection against scale build up or for prevention of any other number of undesired liquid characteristics. Many of the known liquid treatment systems operate with large variations in treatment component concentrations and a reduced life due to the wide variety of operating conditions of the equipment in which they are used, such as extended equipment down times, variable flow rates (often adjusted by an operator) and associated changes in liquid line pressures, and short start and stop intervals. These variations in operating condition can disrupt the consistency of the treatment component concentration in the liquid stream. This impacts system performance by potentially under dosing the liquid with the treatment component, or cost of the treatment component, when liquid is excessively over dosed with the treatment component.

SUMMARY

In general, this disclosure is directed to a liquid treatment system comprising a main flow path, a bypass flow path in fluid communication with a main flow path, a liquid conditioning module in fluid communication with the bypass flow path, the liquid conditioning module having a reservoir holding one or more treatment components to be added to liquid entering the reservoir from the bypass flow path to form a treatment solution, the treatment solution flowing into the main flow path and a tunable pressure differential controller in fluid communication with the main flow path, the tunable pressure differential controller configured for generating a pressure differential in the main flow path between its first portion and second portion, the tunable pressure differential controller configured for controlling a flow rate of liquid into the bypass flow path independently of a flow rate of treatment solution flowing into the main flow path via the bypass flow outlet.

In some cases, the liquid treatment system comprises a dispensing component in fluid communication with the liquid conditioning module and the bypass flow path for controlling flow rates or pressures of treatment solution flowing out of the bypass flow path and into the main flow path independently of flow rate of liquid flowing in the main flow path and/or flow rate of liquid entering the bypass flow path.

In certain embodiments, the treatment component being held in layers in the reservoir, the treatment component layers comprising a dry solid treatment layer near a bottom surface of the reservoir, and a suspended treatment material layer thereabove, such that liquid entering the reservoir forming the treatment solution above the suspended treatment material layer such that treatment solution is formed in layers, each layer having a treatment concentration, the treatment solution layer immediately above the suspended treatment material layer having the highest treatment concentration in the reservoir. The liquid conditioning module comprises a drop tube system having a hollow tube having a first tube end adapted to be freely suspended in the reservoir at a predetermined depth, the predetermined depth corresponding to the treatment layer having the highest treatment concentration in the reservoir and a second tube end fluidly coupled to the outlet of the liquid conditioning module through which the treatment solution flows out of the reservoir toward the main flow path.

The details of one or more examples are set forth in the accompanying drawings and the description below. Other features, objects, and advantages will be apparent from the description and drawings, and from the claims.

DETAILED DESCRIPTION

Figure 1:
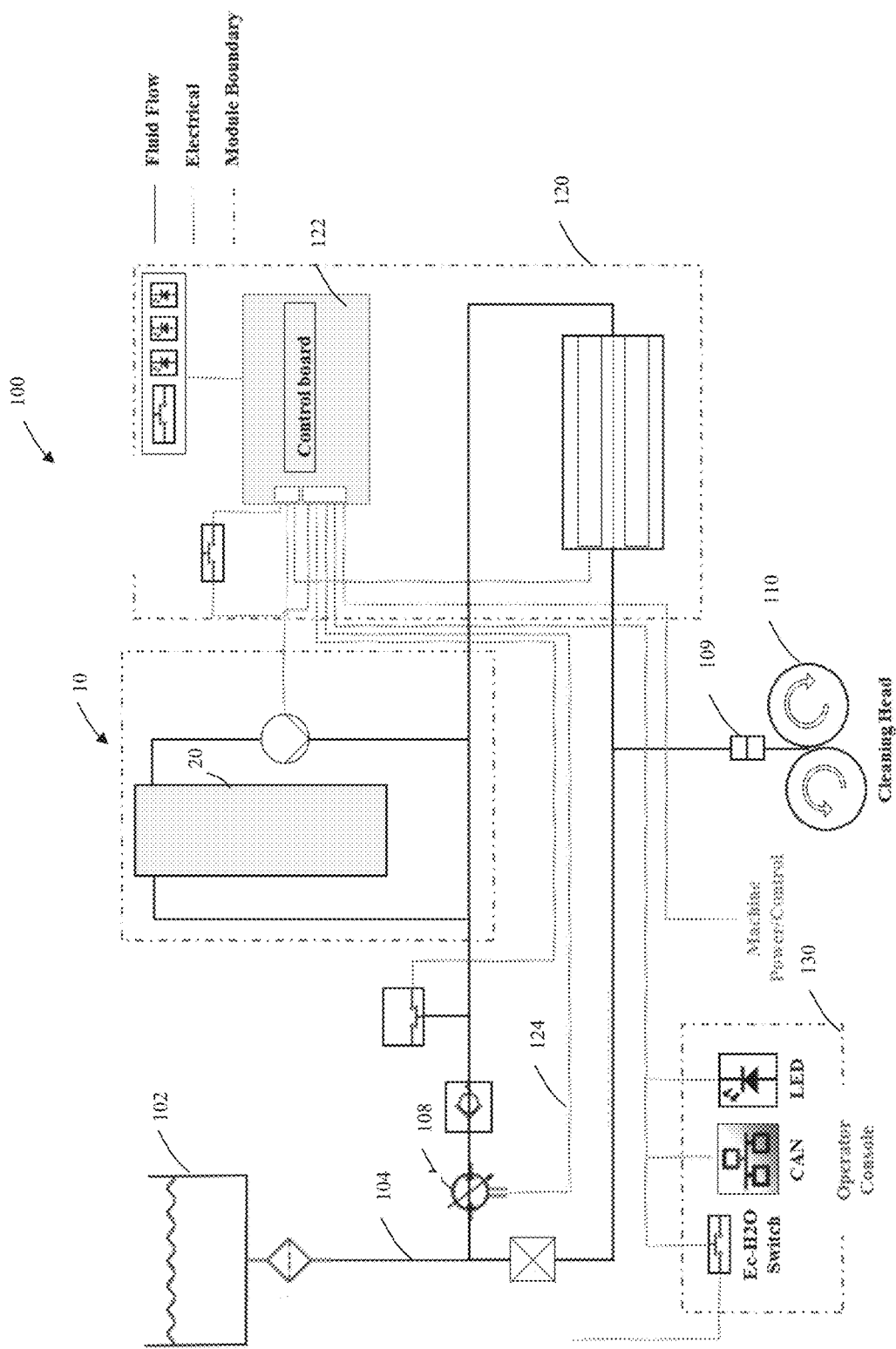
FIG. 1 is an overall schematic of a surface maintenance machine with a liquid treatment system according to an embodiment.

The following detailed description is exemplary in nature and is not intended to limit the scope, applicability, or configuration of the invention in any way. Rather, the following description provides some practical illustrations for implementing examples of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives. It should be appreciated that components of the invention may vary among embodiments of the invention while remaining functionally similar.

Cartridge-based liquid treatment systems can be used in surface maintenance machines such as floor scrubbers, carpet extractors, and the like. In some embodiments, the liquid treatment systems described herein are used in mobile surface maintenance machines such as commercially available walk-behind floor scrubbers, small commercial ride-on floor scrubbers, and large industrial ride-on floor scrubbers. Examples of such machines include the following models, available from Tennant Company, Minneapolis, Minn.: T5, T5e, SS5, A5, 5680, 5700, T7 and SS Rider, T300, T300e, SS300 and A300, or similar machines. Various embodiments may also be used in industrial equipment, such as the following models, also available from Tennant Company: T12, T16, T20, M20 and M30, or other similar equipment.

Machines such as those described herein can perform maintenance tasks such as sweeping, scrubbing, polishing (burnishing) a surface. The surface can be a pavement, road surface and the like. While not shown in the drawings, such machines include a maintenance head assembly having one or more surface maintenance tools such as scrub brushes, sweeping brushes, and polishing, stripping or burnishing pads, wet scrubbing pads, polishing/burnishing and/or buffing pads.

FIG. 1 illustrates an overall schematic 100 showing the flow, electrical and mechanical components of some such surface maintenance machines. In some embodiments, as seen in FIG. 1, such machines can include a fluid source tank 102 and a fluid recovery tank (not shown). In FIG. 1, the boundary of each module is shown by dash-dot line pattern. The fluid source tank can include a fluid source such as a cleaner or sanitizing fluid that can be applied to the surface during maintenance operations. The fluid recovery tank holds recovered fluid source that has been applied to the surface and soiled. The interior of the surface maintenance machine can include passageways 104 (illustrated by solid lines) and fluid control components 108 such as filters, pumps, valves, and the like, and fittings 109 for controlling passage of cleaning fluid from the fluid source tank to a cleaning head 110, and for passage of dirty liquid, debris and other waste from the floor surface toward the recovery tank. Fluid, for example, clean water, which may be mixed with a detergent, can be dispensed from the fluid tank to the floor beneath machine, in proximity to the cleaning head 110, and soiled scrubbing fluid is drawn by a squeegee (not shown) centrally, after which it is suctioned via a recovery hose (not shown) into the recovery tank. In some such cases, the cleaning solution may include a liquid electrolysis system 120 such ec-$H_2O$ system available from Tennant Company, Minneapolis Minn. The liquid electrolysis system 120 can have associated electrical components 122 and connections 124 (illustrated by dotted lines) shown in FIG. 1. An operator can actuate the liquid electrolysis system 120 via controls available on an operator console 130. According to some embodiments, the surface maintenance machine can include a liquid treatment system 10 fluidly coupled to the flow passageways 104 as illustrated.

While the foregoing description described surface maintenance machines in considerable detail, it must be understood that the present disclosure is not limited to surface maintenance machines. In exemplary embodiments, liquid treatment systems such as those described herein may be used in household and commercial appliances such as ice makers, coffee machines, in low flow rate supply liquid applications such as homes, mobile homes and campers. As used herein, 'low' flow rates can refer to flow rates between about 0.05 gallons per minute and about 1.0 gallon per minute. For instance, the flow rate can be as low as 0.1 gallons per minute.

FIGS. 2-6 show some such liquid treatment systems. As seen in the schematic view of FIG. 2, the liquid treatment system 10 comprises a main liquid flow path 12. The main flow path may be a liquid supply line supplying liquid from a liquid source to a desired location (e.g., along direction 13). For instance, the main flow path can be supply liquid from the fluid source tank 102 shown in FIG. 1 to the floor surface in the case of the floor surface maintenance machine, or other locations. Alternatively, the main flow path can be a liquid supply line in a home, or in household or commercial appliances. The main flow path can have a first portion 28 and a second portion 30. The second portion 30 can be downstream of the first portion 28 as illustrated. With continued reference to FIG. 2, the liquid treatment system 10 can tap on to a bypass flow path 14 from the main liquid flow path 12. Certain components of the liquid treatment system, such as liquid conditioning module 20 may be coupled to placed to receive liquid from the bypass flow path 14, and may not directly communicate with the main flow path 12 except when the bypass flow path 14 joins the main flow path 12. In the illustrated schematic, the bypass flow path 14 is defined by the flow path from a bypass flow inlet 16, through a liquid conditioning module 20, via a bypass flow outlet 24. In some such cases, a portion of the main flow path is diverted through the bypass flow path 14 (e.g., along directions 25 and 26) to flow through the liquid treatment system 10. The bypass flow inlet 16 and the bypass flow outlet 24 can be arranged such that the bypass flow path 14 is in fluid communication with the main flow path such that the bypass flow inlet 16 is fluidly coupled to the first portion 28 of the main flow path and the bypass flow outlet 24 is fluidly coupled to the second portion 30 of the main flow path. Advantageously, the liquid treatment system 10 can treat liquid at flow rates as low as between about 0.05 gallons per minute and about 1.0 gallons per minute, and preferably about 0.1 gallons per minute. Accordingly, the bypass liquid flow path can have flow rates as low as about 0.01 to about 0.1 micro liters per minute (e.g. 0.03 micro liters per minute) or between about 0.005% and about 0.01% (e.g., 0.007%) of the flow rate of the main liquid flow path 12.

Figure 2:
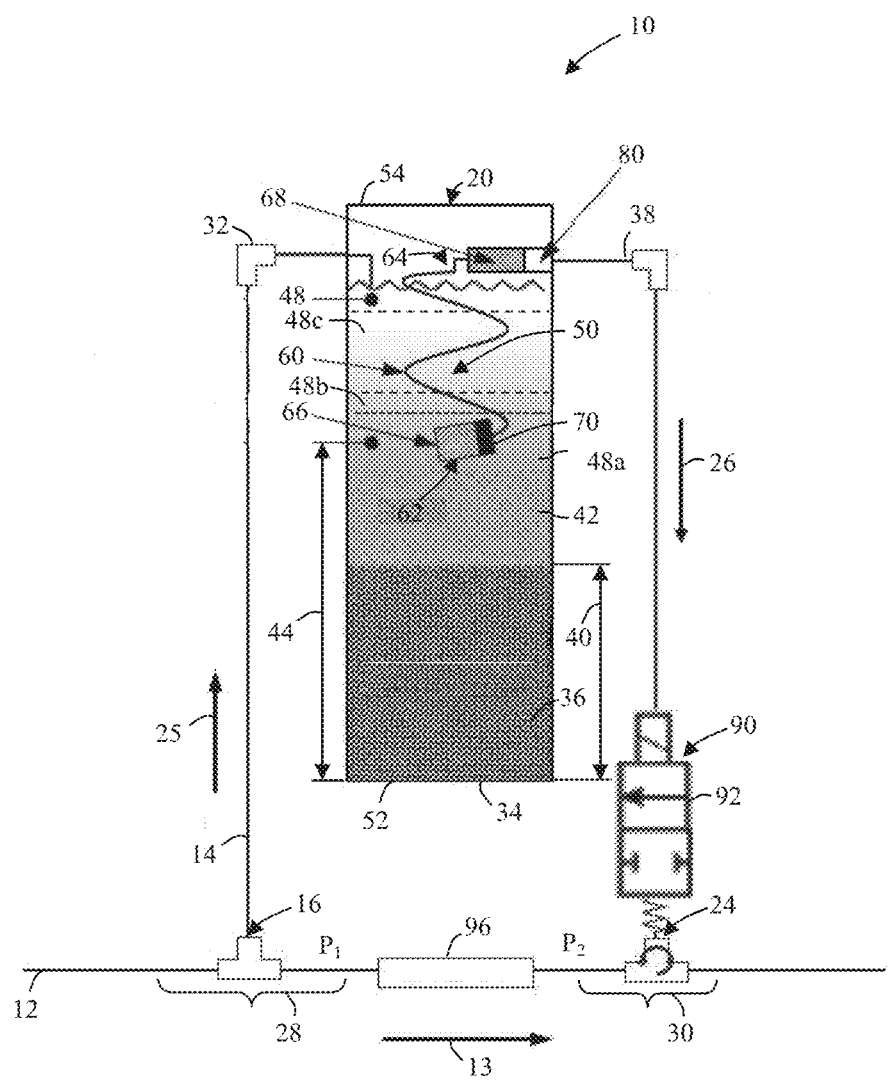
FIG. 2 is schematic of a liquid treatment system according to an embodiment.

Continuing with the above, the liquid treatment system 10 of FIG. 2 comprises one or more liquid conditioning module 20. The liquid conditioning module 20 can be in the form of a cartridge as shown in FIG. 2. In embodiments that have more than one cartridge 20 per liquid treatment system 10, the cartridges 20 can be connected in an appropriate manner to each other and other components of the liquid treatment system (e.g., series or parallel). The liquid conditioning module 20 is located downstream of the bypass flow inlet 16 and upstream of the bypass flow outlet 24 such that it is entirely positioned inline with the bypass flow path 14. The inlet 32 of the liquid conditioning module 20 can be fluidly coupled to the bypass flow inlet 16. The liquid conditioning module 20 comprises a reservoir 34 holding one or more treatment components 36 to be added to liquid entering the reservoir 34 from the bypass flow path 14 to form a treatment solution 48a. In turn, the treatment solution 48a flows into the main flow path via the bypass flow outlet 24. As seen in FIG. 2, the reservoir 34 is fluidly coupled to the inlet 32 of the liquid conditioning module 20, and is upstream of the outlet 38 of the liquid conditioning module 20. The outlet 38 of the liquid conditioning module 20 is fluidly coupled to the reservoir 34 and the bypass flow outlet 24.

The liquid conditioning module 20 can have one or more treatment components 36 held in the reservoir 34, such as chemical agents to control liquid hardness and/or scale inhibitors. Example treatment components 36 include phosphates, citrates, EDTA (ethylenediaminetetraacetic acid), NTA (nitrilotriacetic acid), and/or phosphonates. Other treatment components 36 may also be provided by the liquid treatment system 10, such as detergents, fragrances, antibacterial agents, antimicrobial agents and/or disinfectants. Preferably, the treatment components 36 are in solid (e.g., powder, granular, or crystalline form), although other forms of treatment component are also contemplated.

As seen in FIG. 2, the bypass liquid flow path enters the liquid conditioning module 20 positioned downstream of the bypass flow inlet 16. The liquid entering the liquid conditioning module 20 forms an aqueous solution with the treatment component. The treatment solution 48a then exits the liquid conditioning module 20 via the bypass flow outlet 24 positioned downstream thereof and returns to the main liquid flow path 12, where it is added to the main liquid flow path 12 at a rate to achieve the desired final concentration of treatment component in the main liquid flow path 12. The rate at which the treatment solution 48a is added to the main liquid flow path 12 can be controlled independently of the flow parameters (e.g., flow rate, pressure, etc.) of the main flow path controlled by a tunable pressure differential controller 96. The bypass flow path 14 includes the flow components (e.g., pipes, fluid connectors, valves and the like) for introducing liquid into the liquid conditioning module 20 to hydrate the treatment material into a saturated solution concentrate, provide the pressure required to advance the treatment solution 48a out of the liquid conditioning module 20 and into the dispensing portions of the system, and blend the treatment solution 48a out of the dispensing means back into the main liquid flow path 12. In addition, the liquid conditioning module 20 may be designed with the external sides of both the inlet 32 and outlet 38 fitted with push-to-connect fittings for tool-less liquid conditioning module 20 replacement.

As described above, the liquid conditioning module 20 is in the form of a cartridge and includes a reservoir 34 which contains the liquid treatment component. The treatment component may be concentrated and may be a solid, in the form of a cake, pellets, or granules, a paste, a gel or a liquid, or any combination of these physical states at any given time. The liquid conditioning module 20 includes an inlet 32 in fluid communication with the bypass flow inlet 16 for the inflow of liquid into the reservoir 34. The incoming liquid added to the liquid conditioning module 20 stays on the surface due to its lower specific gravity relative to the specific gravity of the treatment component. Eventually, the incoming liquid begins to saturate in the reservoir 34 over time.

In the schematic illustrated in FIG. 2, the bypass liquid flow path entering the inlet 32 is in a generally horizontal orientation and the liquid conditioning module 20 is in a generally vertical orientation. In this orientation, the liquid conditioning module 20 contains a treatment component that is a generally dry solid layered toward the bottom of the liquid conditioning module 20 up to a depth 40.

Continuing with the foregoing description, as liquid such as water enters the reservoir 34, it mixes the treatment component, forming a suspension 42 of the treatment component directly above the upper surface of the dry treatment solid layer 36a. The dry solid layer 36 can be a layer wherein the treatment component has not absorbed any liquid entering the liquid conditioning module 20. Above this layer is a layer of suspended treatment material wherein the treatment component has absorbed some liquids, but the treatment component has not yet dissolved to form a solution. The suspended treatment material layer 42 extends to a depth 44 as shown in FIG. 2.

With continued reference to FIG. 2, above the suspended treatment material layer 42 is a layer 48a comprising aqueous treatment solution 48 in which the treatment component has been dissolved in liquid in the bypass flow path 14. The aqueous treatment solution 48 layer 48a can comprise several layers 48a, 48b, . . . etc. of the aqueous treatment solution 48, each having a concentration of the aqueous treatment solution 48. For example, in the schematic shown in FIG. 2, the aqueous treatment solution 48 is at its highest concentration 48a of treatment component immediately above the layer 42 of suspended treatment material, and becomes progressively more dilute toward the top of the liquid conditioning module 20. That is, the highest concentration 48a of treatment component in the suspension layer 42 is directly above the suspension layer 42. The highest concentration, as is apparent to one skilled in the art, depends on the saturation limit (e.g., the point at which solution of the treatment component cannot further dissolve into the solution), with the layer 48a having the treatment component fully saturated to form the treatment solution with the highest concentration.

As the treatment solution 48a becomes progressively more dilute with increasing depth above the suspended treatment material layer 42, the solution used for liquid treatment is obtained from the layer 48a of highest concentration solution, immediately above the suspended treatment material layer 42. The solution exits the liquid conditioning module 20 from this layer 48a by way of a drop tube system 50, described further below, through the outlet 38 in fluid communication with the bypass flow path 14 outlet 38, ultimately joining the main flow path.

As mentioned previously, the treatment solution layer 48a immediately above the suspended treatment material layer 42 has the highest treatment concentration 48a in the reservoir 34. When the liquid conditioning module 20 has not been previously used to treat liquid, the reservoir 34 contains a large amount of the treatment component. As a result, when liquid enters the reservoir 34, the suspended treatment material layer 42 and the layer 48a of highest solution concentration are close to the top of the reservoir 34. However, with use over time, the treatment component dissolves, leaving less of the treatment components 36 in the reservoir 34. The suspended treatment material layer 42 is lower (e.g., closer toward the bottom surface 52 of the reservoir 34) in the reservoir 34 over time, as is the layer 48a of highest concentration of treatment solution. Accordingly, the treatment solution layer 48a having the highest treatment concentration is near an upper surface 54 of the reservoir 34 when the treatment component is at a maximum value in the reservoir 34 (e.g., corresponding to the saturation or solubility limit of the treatment component). The treatment solution layer 48a having the highest treatment concentration moves toward the bottom surface 52 of the reservoir 34 when the treatment component forms the treatment solution 48 and dispensed into the main flow path over time (e.g. with use, the amount of solids being dissolved to form the treatment solution).

In some embodiments, as shown in FIG. 2, the liquid conditioning module 20 comprises a drop tube system 50. As mentioned previously, the solution having a desired concentration of the treatment component exits the liquid conditioning module 20 via the drop tube system 50. As mentioned previously, with use, the depth 44 immediately above which the layer 48a at highest concentration of the treatment component in the solution is lowered toward the bottom surface 52 of the reservoir 34 of the liquid conditioning module 20. The drop tube system 50 adjusts its position just above the suspended treatment material layer 42 automatically directly above the layer 42 of suspended treatment material, at the location of highest concentration 48a solution at any given time, such that the treatment solution 48 that leaves the liquid conditioning module 20 has a uniform concentration throughout the life of the liquid conditioning module 20.

In the exemplary embodiment illustrated in FIG. 2, the drop tube system 50 is shown resting immediately on top of the suspended treatment material layer 42. The drop tube system 50 comprises at least a partially coiled tube 60 submerged in or immediately above the suspended treatment material layer 42. The tube is generally hollow having a first tube end 62 freely suspended in the reservoir 34 at a predetermined depth 44. The predetermined depth 44 corresponds to the treatment layer 48a having the highest treatment concentration 48a in the reservoir 34 just above the suspended treatment material layer 42. As is apparent to one skilled in the art, the predetermined depth 44 varies over the life of the liquid conditioning module 20, remaining generally close to the top surface of the reservoir 34 at the beginning of the useful life of the liquid conditioning module 20, moving toward the bottom surface 52 of the reservoir 34 toward the end of the useful life of the liquid conditioning module 20.

The tube is flexible relative to the walls of the reservoir 34 and has a first tube end 62 and a second tube end 64. The first tube end 62 can sometimes referred to as a "free end" because it is freely suspended in the treatment solution 48a. The first tube end 62 is connected to a coarse filter 66 supported by a weight 70 at a first tube end 62. The second tube end 64 can be fluidly coupled to the outlet 38 of the liquid conditioning module 20 through which the treatment solution 48a flows out of the reservoir 34 toward the main flow path. For example, in the illustrated embodiment, the second tube end 64 is connected to a fine filter 68. In turn, the fine filter 68 is proximal to and positioned upstream of the outlet 38 of the bypass liquid flow path. In this manner, the drop tube is configured to remain in fluid communication with the suspended treatment material layer 42 of the liquid conditioning module 20 and the outlet 38 of the bypass liquid flow path.

As is apparent to one skilled in the art, the tube is of a length sufficient to extend from the outlet 38 of the reservoir 34 to the bottom surface 52 of the reservoir 34. In the latter case, as the treatment component is consumed and the liquid conditioning module 20 reaches the end of its life, the tube has a length sufficient to be suspended above but proximal to the bottom surface 52 of the reservoir 34 such that the tube remains in fluid communication with the layer 48a of highest treatment component concentration and the outlet 38 of the reservoir 34. Additionally, the tube is sufficiently flexible relative to the walls of the reservoir 34 to bend and coil at the top of the reservoir 34 when the liquid conditioning module 20 is full having a predetermined maximum level of treatment component.

As indicated previously, and as seen in FIG. 2, the first tube end 62 is connected to a weight 70 and includes a coarse filter 66. The weight 70 is attached to the first tube end 62 such that the first tube end 62 maintains its position at or immediately above the suspended treatment material layer 42. Accordingly, the first tube end 62 remains suspended in the treatment solution layer 48a having the highest treatment concentration. In some cases, the weight 70 can be a steel sleeve, steel spheres or bearings fitted inside the coarse filter 66, or a heavy steel fitting between the coarse filter 66 and the drop tube. Other alternative weights may be used. If the weight 70 is too heavy, the first tube end 62 may descend into the layers of suspended treatment material layer 42 instead of remaining immediately thereabove. If the weight 70 is too light, the first tube end 62 may rise further above from the layer 48a of highest concentration of the treatment solution 48 and into layers where the solution is less concentrated. As was described previously, the solution concentration varies with depth 44 of the reservoir 34 with layers of least concentrated solution being at the top of the reservoir 34. Accordingly, in some preferable embodiments, the weight 70 is chosen to maintain the first tube end 62 in a position corresponding to the layer 48a of highest solution concentration and/or immediately above the suspended treatment material layer 42 at any given time.

Embodiments such as those described above facilitate the first tube end 62, and correspondingly the tube inlet to be in fluid communication with a constant concentration of treatment solution 48a. While the weight 70 attached to the first tube end 62 may be adapted to maintain a desired position corresponding to a desired solution concentration, the actual weight of the weight 70 attached to the first tube can be chosen based on the specific treatment material being used. The appropriate weight for a particular liquid conditioning module 20 and system may be determined experimentally.

In some embodiments, the size, weight and position of the weight 70 relative to the filter within the first tube end 62 of the drop tube may position the first tube end 62 and maintaining a desired orientation of the coarse filter, such as keeping the coarse filter lying horizontally within the liquid conditioning module 20. In some embodiments, the first tube end 62 including the filter settles partially into the layer 42 of suspended treatment material, with a portion above in the layer of saturated solution 48a, thereby allowing the upper part of the first tube end 62 with the coarse filter to draw solution into the tube from the layer 48a of saturated solution at the deepest (e.g., lowermost) level. In addition, the first tube end 62 may be shaped to promote the desired orientation of the first tube end 62 and of the filter within it. For example, in some embodiments, the first tube end 62 may be cylindrical in shape, to encourage it to lie on its side, with its central axis of the cylindrical first tube end 62 being generally horizontal and/or parallel to the treatment solution 48a layers. Other shapes may alternatively be used.

As mentioned previously, the coarse filter 66 is connected to the first tube end 62. The coarse filter 66 can be a micro porous UHMW filter and may be included to prevent passage of solid treatment component into the tube. For example, in some embodiments this coarse filter 66 may be a 0.6 inch long by 0.3 in diameter cylindrical 40-50 µm porous UHMWPE plastic filter.

With continued reference to FIG. 2, the treatment solution from a layer 48a of desired concentration, enters into the coarse filter 66, and passes through the coarse filter 66 and into the hollow tube, ultimately leaving the liquid conditioning module 20 via its outlet 38. The flow of treatment solution may then pass via one or more of a wick, a fine filter 68, an dispensing component 80, and/or a programmable metering device 90 (e.g., a solenoid valve, a pump, or any combination of these). In the embodiment illustrated in FIG. 2, the treatment solution 48 can pass through a fine filter 68 fluidly and/or physically coupled to the second tube end 64. The fine filter 68 is positioned downstream of the first tube end 62, and proximal to the second tube end 64. In the illustrated embodiment, the fine filter 68 is positioned proximal to the outlet 38 of the liquid conditioning module 20. The fine filter 68 can be of any shape, and have filter pore size suitable to filter solids having a predetermined size. For example, in some embodiments the fine filter 68 may be a 0.50 inch long by 0.17 inch diameter 20 µm porous polyethylene plastic rod. Optionally, the fine filter 68 may include a porous wick. The use of a porous wick can facilitate the removal of air bubbles from the liquid conditioning module 20. Additionally, the porous wick can facilitate removal of solid crystals (e.g., of the treatment component) that may form over time. Such embodiments facilitate the liquid conditioning module from having obstructions to flow over time.

Referring again to FIG. 2, the liquid conditioning module 20 includes a dispensing component 80 positioned therein and proximal to and fluidly coupled with the outlet 38 of the liquid conditioning module 20. The dispensing component 80 controls flow parameters (e.g., flow rates, pressures, and the like) of the treatment solution 48 flowing out of the bypass flow path 14 and into the main flow path. In the embodiment illustrated in FIG. 2, the dispensing component 80 is downstream of the fine filter 68, although other embodiments are also contemplated. In some cases, the dispensing component 80 can be an orifice restrictor.

The wick or fine filter 68 may be located upstream of the dispensing component 80, such as immediately upstream and directly in contact with the dispensing component 80. The dispensing component 80 may be sized to allow a steady flow, such as a steady drip, of solution. However, such a dispensing component 80 may become clogged over time due to the formation of crystals in and around the dispensing component 80. Such crystals that block flow in the dispensing component 80 may form when air bubbles appear in the solution, or at any gas/liquid (e.g., air/solution interface). The use of the fine filter 68 or wick at the orifice restrictor can reduce or eliminate this problem by diffusing air bubbles. In this way, the dispensing component 80 assists in maintaining a steady flow over time.

The dispensing component 80 can be an orifice restrictor made of a single molded plastic component with an inside diameter in the range of 0.003-0.020 inches, for example, but other designs and sizes are also possible. The outside size and shape of the dispensing component 80 may be sized to fit within small cross-sections of the flow path of the treatment solution 48. While the illustrated embodiment shows the wick, fine filter 68 and dispensing component 80 located inside the liquid conditioning module 20 (e.g., cartridge), such components may be located outside and/or, downstream of the outlet 38 of liquid conditioning module 20 or at other suitable locations.

In some embodiments, optionally, dispensing component 80 can be in fluid communication with a programmable metering device 90, such as an actuated solenoid valve 92, a motor driven pump 94 (best seen in FIGS. 5A and 5B), or any other similar metering device driven by an appropriate electrical control circuit (not shown). The appropriate duty cycle for the solenoid valve or pump for any given machine flow rate settings may be programmed into the control circuit, and selected with each corresponding machine flow rate setting. The dispensing component 80 can be positioned at a desirable location in the bypass flow path 14 to suitably dispense the treatment solution 48. For instance, the dispensing component 80 can be positioned within the liquid conditioning module 20 and upstream of the outlet 38 of the liquid conditioning module 20. Alternatively, the dispensing component 80 can be positioned outside the liquid conditioning module 20 and downstream of the outlet 38 of the liquid conditioning module 20.

With continued reference to FIG. 2, the flow leaving the outlet 38 of the liquid conditioning module 20 flows out of the bypass flow path 14 outlet 38 via a solenoid valve for dispensing the treatment solution 48 in a controlled manner into the main flow path. Accordingly, the dispensing component 80 (e.g., orifice restrictor) and a programmable metering device 90 (e.g., solenoid valve or pump) can control the flow rate of treatment independently of the flow parameters (e.g., flow rate, pressure, and the like) of the main flow path. In some cases, instead of a solenoid valve, a pump may be used to control flow of treatment solution 48 from the bypass flow outlet 24 and into the main flow path. The solenoid valve and/or pump may be located outside and downstream of the liquid conditioning module 20. While a solenoid valve provides active control of the flow out of the liquid conditioning module 20, the outflow of solution from the liquid conditioning module 20 may be controlled alternatively, in a passive manner. In such cases, embodiments with active control (e.g., pump and solenoid valve) may be able to dispense the treatment solution in a more precise manner than embodiments with passive control (e.g., orifice restrictor with or without wicks). As is apparent to one skilled in the art, such embodiments may allow (e.g., due to higher precision) the flow rate and/or pressure of the treatment solution to depend less and/or be insensitive to variation in main flow path 12 (e.g., flow rate or pressure difference then of).

In some embodiments, the use of such a bypass flow path 14 allows for independent control of the treatment solution 48a flow rate through the liquid conditioning module 20 relative to the flow rate in the main flow path. For example, the pressure of main flow path in the first portion 28 at or near the bypass flow inlet 16 can be $P_1$, and the pressure of main flow path in the second portion 30 at or near the bypass flow outlet 24 can be $P_2$. A tunable pressure differential controller 96 positioned between these two locations can alter the pressure of the main flow path such that the pressure $P_1$ is greater than the pressure $P_2$. This differential pressure can be modified with appropriate pressure control devices, such as flow restrictor inserts, constrictions, fittings and the like, to "fine tune" a specific differential pressure range relative to the main process liquid flow range, providing consistent treatment over a wide variety of usage conditions of the liquid conditioning module. The dispensing component 80 can, in turn control flow parameters (e.g., flow rate, pressure and the like) of the treatment solution 48a for a given set of flow parameters of the main flow path.

According to some exemplary embodiments such as those illustrated in FIGS. 2-4 and 6, the flow rate of treatment solution 48a in the outflow portion of the bypass flow path 14 is controlled distinctly and independently of the flow rate of main flow path. As described above, the flow rate of liquid in the main flow path is controlled via a tunable differential pressure controller such as a flow restrictor plate. Likewise, the pressure of liquid in the main flow path can be controlled distinctly and independently of the pressure of treatment solution 48a being added to the main flow path via the bypass flow outlet 24. In such cases, dispensing components such as those described above for dispensing treatment solution 48a at the outlet 38 of or downstream of the liquid conditioning module 20 can provide the ability to adjust for proportional control of flow rates and/or pressures of the treatment solution 48a for any given liquid flow/differential pressure in the main flow path. The dispensing component 80 can also accommodate variations in the treatment solution 48a viscosity levels.

In some embodiments, liquid conditioning module 20 can deliver an effective concentration of the treatment component for extended periods of time, such as more than 2 years, using a single liquid conditioning module 20. In some embodiments, the system has the ability to tune in the treatment solution 48 dosage rate needed (e.g., below 2 parts per million) for a particular liquid flow rate and line pressures, to accommodate the types of equipment which use the system.

Figure 3:
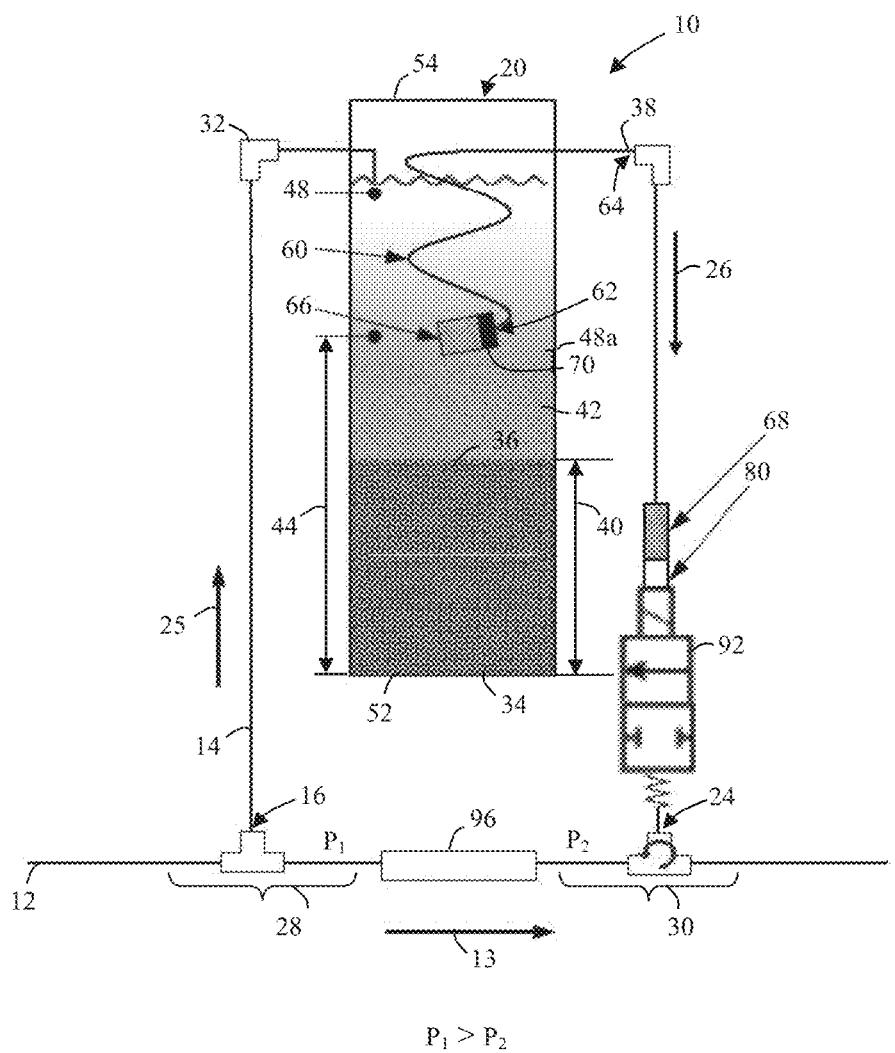
FIG. 3 is a schematic of a liquid treatment system according to another embodiment.

FIG. 3 is a schematic showing liquid treatment system 10 according to another embodiment. The liquid treatment system 10 of FIG. 3 is substantially similar to the schematic shown in FIG. 2 except for the differences described herein. In FIG. 3, the fine filter 68 and/or wick and the dispensing component 80 (e.g., the orifice restrictor) are located outside of the liquid conditioning module 20, immediately upstream of the solenoid valve. Alternatively, the fine filter 68 or wick and dispensing component 80 could be located at any location in the outflow portion of the bypass flow path 14 of treatment solution 48 between the outlet 38 of the liquid conditioning module 20 and the solenoid valve 92.

Figure 4:
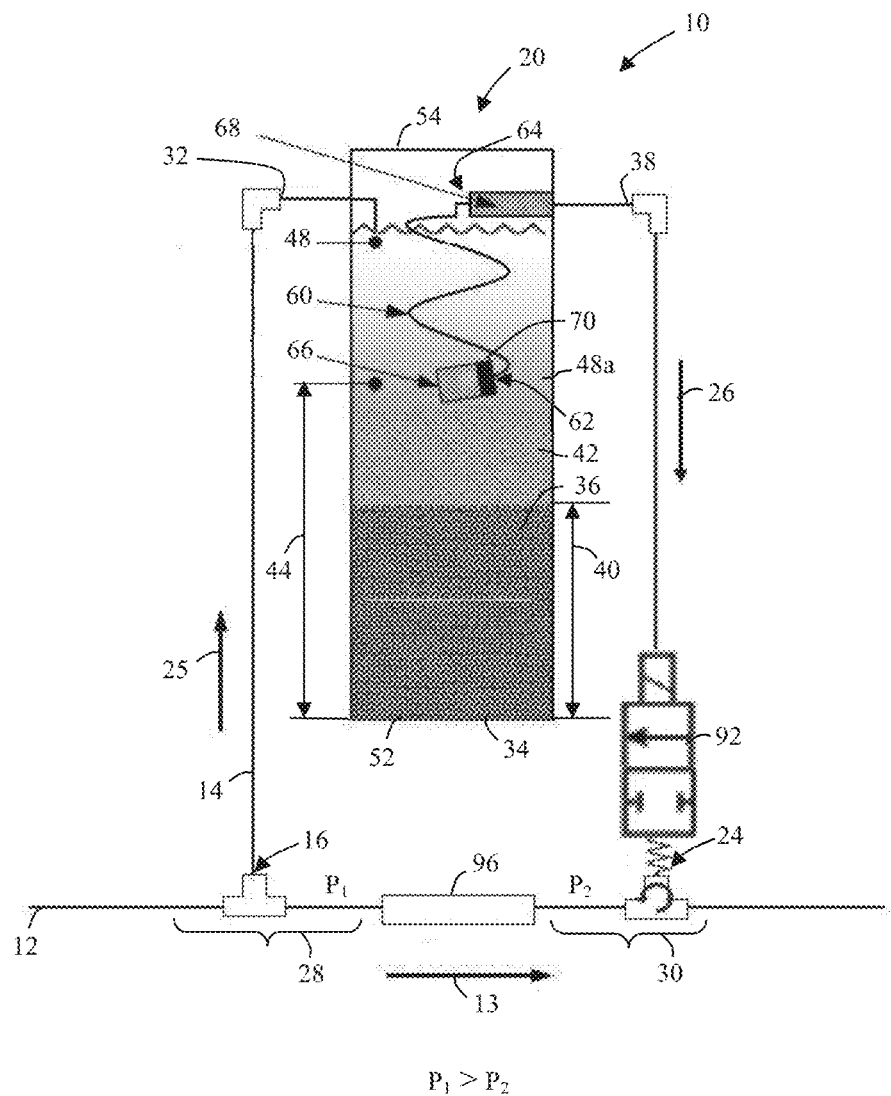
FIG. 4 is a schematic of a liquid treatment system according to another embodiment.

FIG. 4 is a schematic showing liquid treatment system 10 according to another embodiment. The liquid treatment system 10 of FIG. 4 is substantially similar to the schematic shown in FIG. 2 except for the differences described herein. In FIG. 4, a fine filter 68 or wick is present at or immediately upstream the outlet 38 of the liquid conditioning module 20. However, the system does not have an orifice restrictor for controlling outflow of treatment solution 48. The fine filter 68 or wick could alternatively be located anywhere along the outflow of the solution from the outlet 38 to the pump. Alternatively, in other embodiments, the fine filter 68 or wick are not used.

Figure 5A:
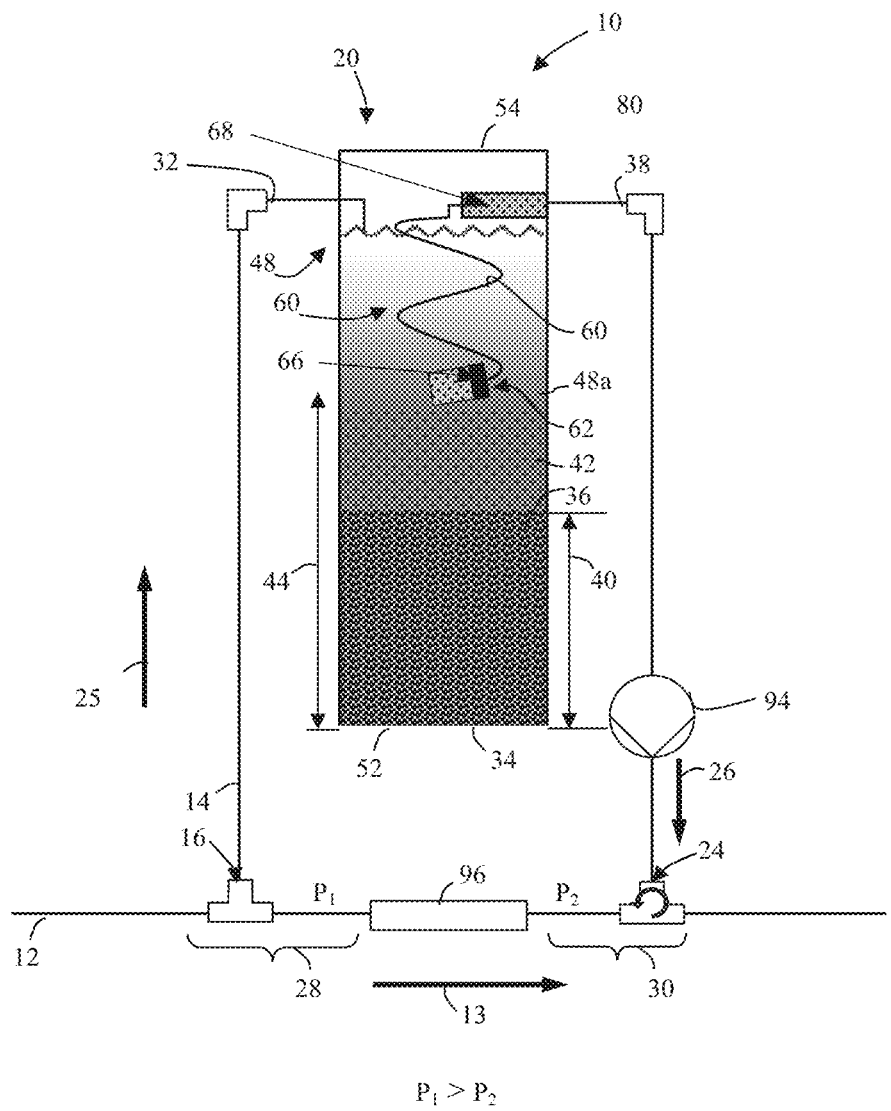
FIG. 5A is a schematic of a liquid treatment system according to another embodiment.

FIG. 5A is a schematic showing liquid treatment system 10 according to another embodiment. The liquid treatment system 10 of FIG. 5A is substantially similar to the schematic shown in FIG. 2 except for the differences described herein. In FIG. 5A, the liquid treatment system 10 includes a fine filter 68 or wick positioned within the liquid conditioning module's boundaries. However, the liquid treatment system does not include an orifice restrictor or a solenoid valve. Instead, a pump 94 controls the flow rate of treatment solution 48 into the main flow path 12. The fine filter 68 or wick are illustrated as being present within the boundaries of the liquid conditioning module 20 but could alternatively be located anywhere along the outflow of solution from the outlet 38 to the return of the bypass to the main liquid flow. Of course, the fine filter 68 or wick are optionally not included in other embodiments. In FIG. 5A, the fine filter 68 and wick are located immediately upstream of the bypass flow outlet 24.

Figure 5B:
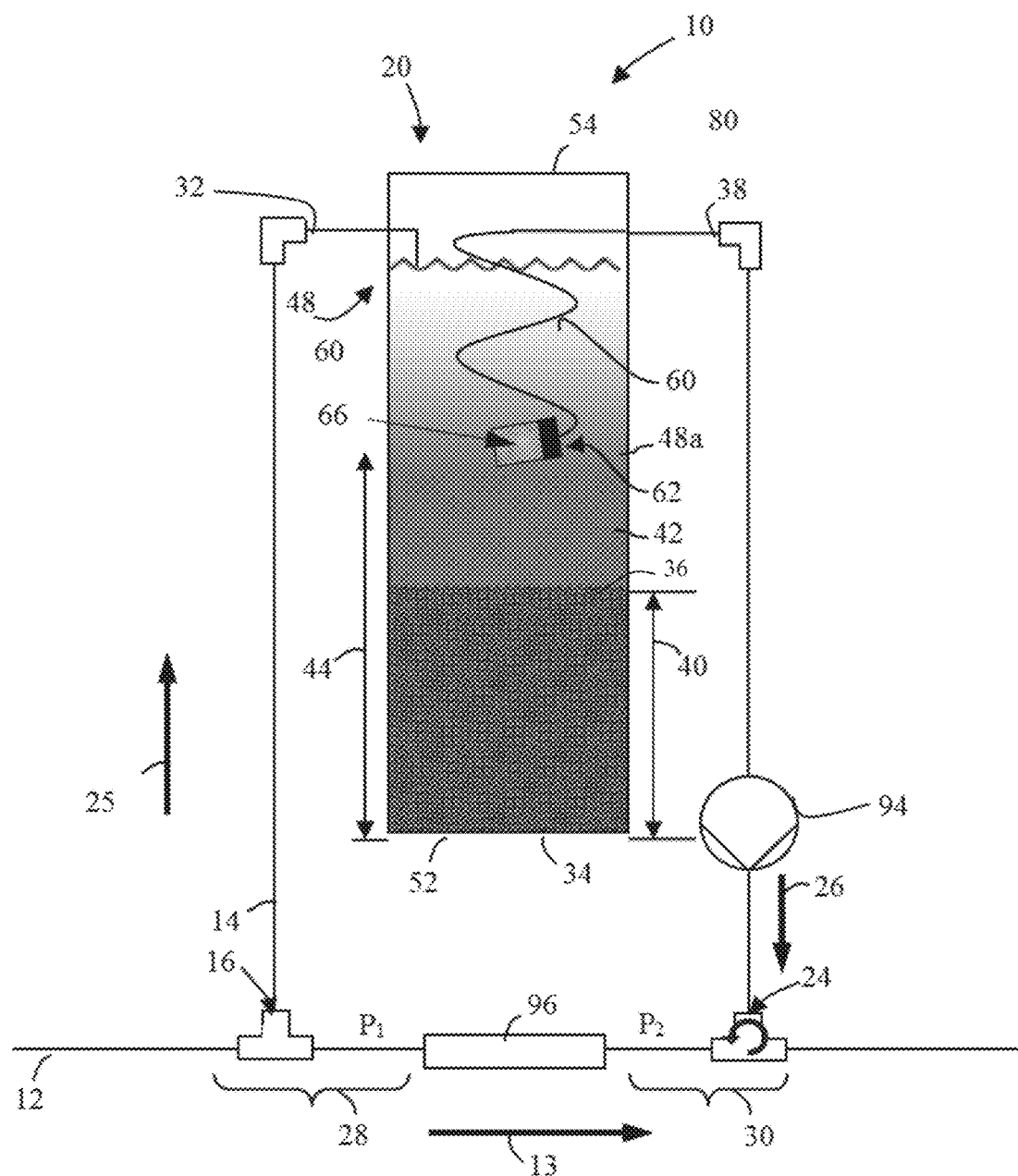
FIG. 5B is a schematic of a liquid treatment system according to another embodiment.

FIG. 5B is a schematic showing liquid treatment system 10 according to another embodiment. The liquid treatment system 10 of FIG. 5B is substantially similar to the schematic shown in FIG. 5A except for the differences described herein. In FIG. 5B, the liquid treatment system 10 does not include a fine filter 68, wick, an orifice restrictor or a solenoid valve. Instead, a pump 94 controls the flow rate of treatment solution 48 into the main flow path 12.

Figure 6:
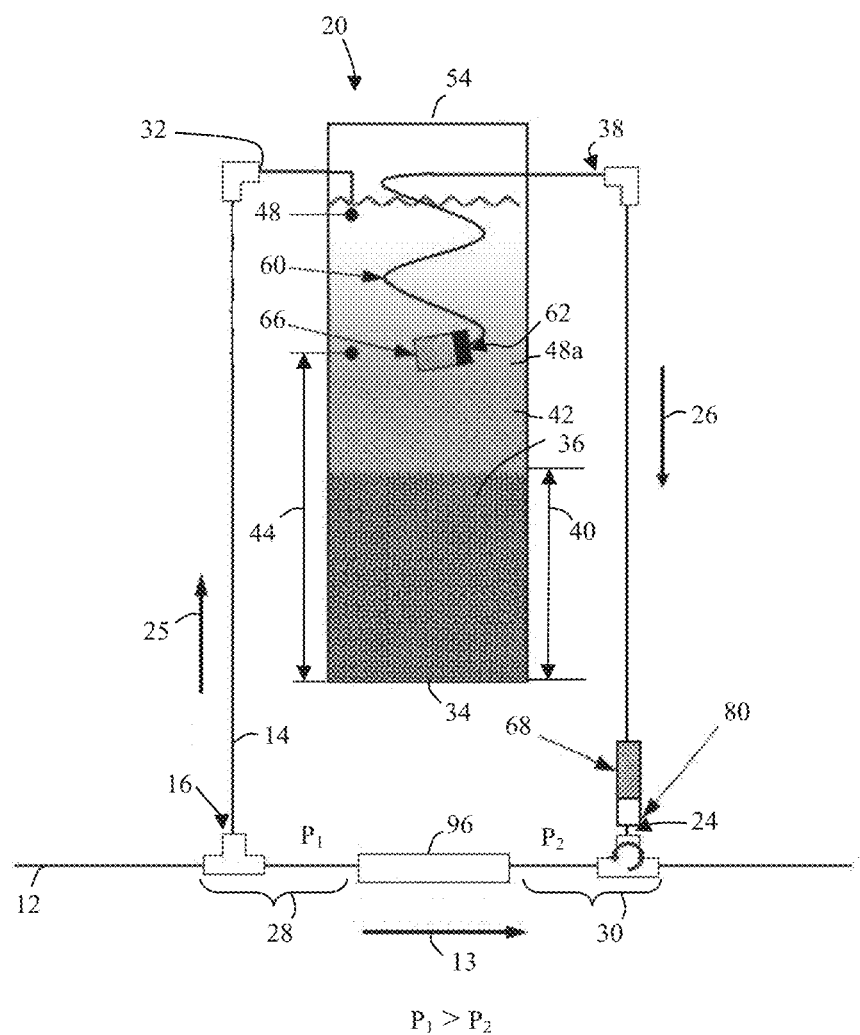
FIG. 6 is a schematic of a liquid treatment system according to another embodiment.

FIG. 6 is a schematic showing the liquid treatment system 10 according to another embodiment. The liquid treatment system 10 of FIG. 6 is substantially similar to the schematic shown in FIG. 2 except for the differences described herein. In FIG. 6, the liquid treatment system 10 does not include a solenoid valve or a pump. However, the liquid treatment system 10 includes a fine filter 68 or wick and an orifice restrictor. In FIG. 6, the fine filter 68, wick and orifice restrictor 80 are illustrated as being positioned downstream of the outlet 38 of the liquid conditioning module 20 but could alternatively be located anywhere along the outflow of solution from the outlet 38 of the liquid conditioning module 20 to the bypass flow outlet 24. In FIG. 5A, the fine filter 68 and wick are located immediately upstream of the bypass flow outlet 24. The control of liquid flow is therefore entirely passive, with no active component distributing the liquid into the main liquid flow.

Figure 7:
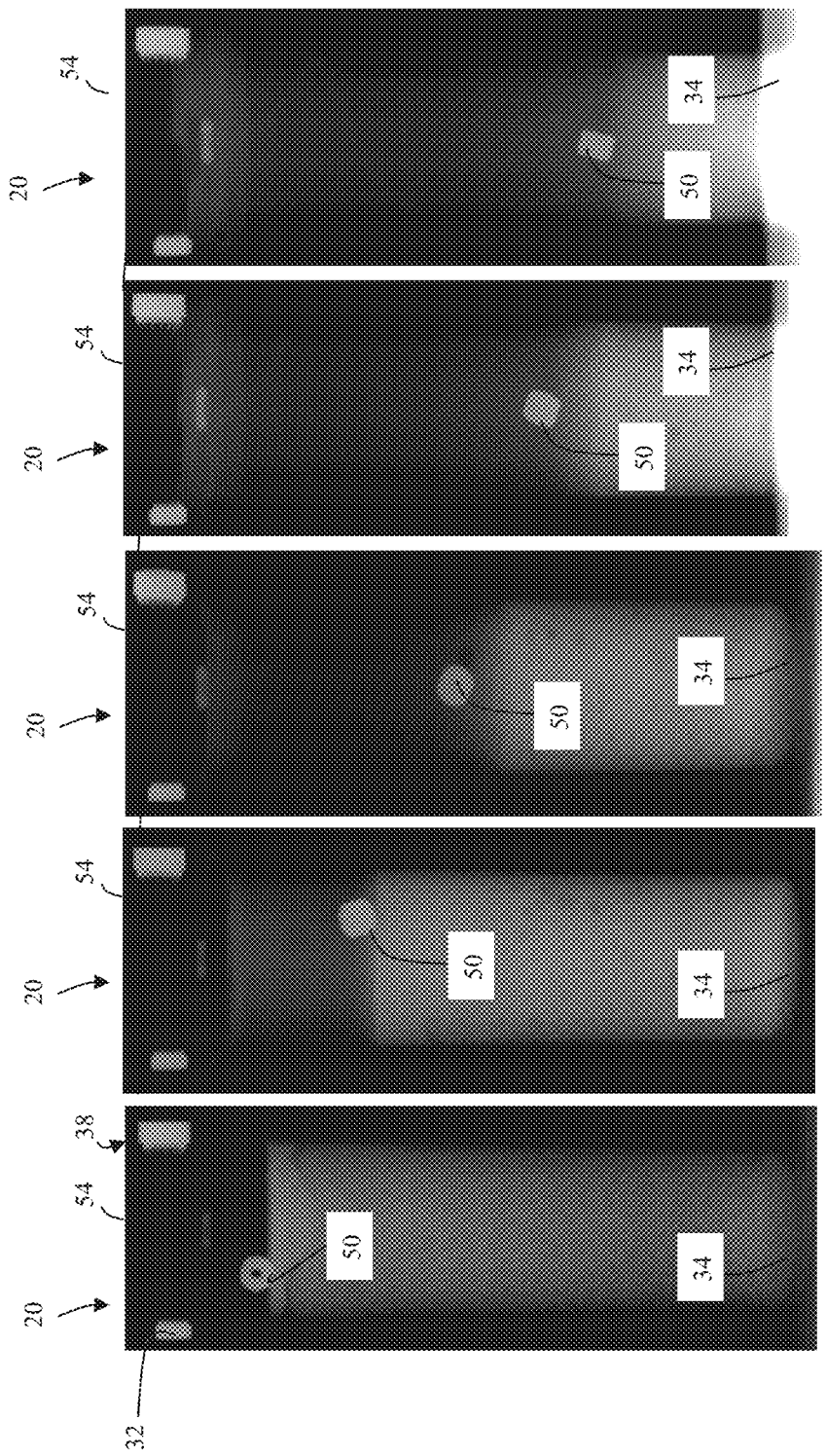
FIG. 7 is an X-ray image of the liquid conditioning module that describes the position of the drop tube system at different liquid volumes.

As described previously, the treatment solution layer 48a having the highest treatment concentration is near the upper surface 54 of the reservoir 34 when the treatment component is at a maximum value in the reservoir 34 (e.g., corresponding to the saturation or solubility limit of the treatment component). The treatment solution layer 48a having the highest treatment concentration moves toward the bottom surface 52 of the reservoir 34 when the treatment component forms the treatment solution 48 and dispensed into the main flow path over time (e.g. as solids continue to be dissolved to form the treatment solution). FIG. 7 illustrates a series of X-ray images of the liquid conditioning module 20 and the position of the drop tube system 50, at various points during the dissolving of the solids. In the left most image, the liquid conditioning module does not have any liquid therein, and the drop tube system 50 is near the upper surface 54 relative to its position in other images. As water is being added, the solids dissolve to form the treatment solution, with the drop tube system 50 being configured (e.g., by weight 70) to maintain its position generally horizontally on the layer 48a of highest concentration. In the right most image shown in FIG. 7, the layer 48a of highest concentration, and the drop tube system 50 are both near the bottom surface 34 of the liquid treatment system 20, relative to their location in other images shown in FIG. 7.

The liquid treatment system 10 dispenses one or more treatment components 36 (e.g., a chemical agent) into liquid to form a solution. In some embodiments, the liquid treatment system 10 is designed to be capable of dispensing extremely small doses of a treatment component into a liquid stream, such as a main liquid stream of mobile surface maintenance machine, over an extended period of time. For example, the liquid treatment system 10 may be able to dispense the treatment component into the liquid stream at a rate sufficient to achieve a solution concentration of about 2 parts per million (PPM) or less over an extended period of time. Furthermore, the liquid conditioning module 20 can be replaced easily by the equipment operator to maintain the long term performance.

Such machines and equipment may be modified to include the bypass flow path 14 (such as tubing) and liquid conditioning modules of the various embodiments in the current solution flow system, such as in conjunction with a liquid electrolysis system such as the EC-H$_2$O system available from Tennant Company, Minneapolis, Minn. In liquid electrolysis systems, the development of scale can be a problem and therefore the various embodiments described herein can be useful when applied to the liquid upstream of the electrolysis system.

Various embodiments may be used in commercial floor surface maintenance machines such as floor scrubbers. In some embodiments, such as in the machines and equipment described above, the machines and equipment include a storage tank which may hold untreated liquid for later use. Tubing may run from the storage tank to a pump and then to the liquid conditioning module 20, which may include bypass flow path 14 for liquid flow through the liquid conditioning module 20 as well as tubing running in parallel for the main flow path according to any of the embodiments described herein. Liquid which includes the treatment component may flow from the outlet 38 of the liquid conditioning module 20 through the bypass flow path 14 to merge with the main flow path, such that the entire liquid stream includes the diluted treatment component. After merging, the liquid then continues to flow through tubing to a desired system (e.g., liquid electrolysis system for electrolysis of the treated liquid). Liquid may then flow from the desired system for its intended use.

Various characteristics are described below with reference to particular numbered embodiments. However, other combinations of elements and other embodiments are also within the scope of the invention.

The invention claimed is:

1. A liquid treatment system comprising:
   a main flow path having a first portion and a second portion, the second portion being downstream of the first portion;
   a bypass flow path having a bypass flow inlet and a bypass flow outlet, the bypass flow inlet being fluidly coupled to the first portion of the main flow path and the bypass flow outlet being fluidly coupled to the second portion of the main flow path;
   a liquid conditioning module coupled to and placed in the bypass flow path for receiving liquid from the bypass flow path, the liquid conditioning module having an inlet fluidly receiving liquid from the bypass flow inlet,
      a reservoir holding one or more treatment components, the reservoir being fluidly coupled to the inlet of the liquid conditioning module, such that liquid entering the reservoir from the bypass flow path mixes with the treatment component to form a treatment solution arranged in layers of different concentration in the reservoir, and
      an outlet fluidly coupled to the reservoir, and located downstream of the inlet of the liquid conditioning module, for supplying the treatment solution into the main flow path via the bypass flow outlet,
      a drop tube system comprising
         a hollow tube having a first tube end having a weight, the weight adapted to freely suspend the first tube end in the reservoir at a particular treatment solution layer between an upper surface and a bottom surface of the reservoir corresponding to a desired treatment concentration in the reservoir and
         a second tube end fluidly coupled to the outlet of the liquid conditioning module through which the treatment solution flows out of the reservoir toward the main flow path,
         a coarse filter fluidly coupled to the first tube end, and a fine filter fluidly coupled to the second tube end, the coarse filter having filter pore sizes greater than filter pore sizes of the fine filter, and
   a pressure reducer fluidly coupled to the main flow path and configured to reduce the pressure in the main flow path, such that a pressure of the fluid in the first portion is greater than a pressure of fluid in the second portion.

2. The liquid treatment system of claim 1, wherein the liquid conditioning module is in the form of a cartridge.

3. The liquid treatment system of claim 1, wherein the reservoir contains one or more treatment components in solid form.

4. The liquid treatment system of claim 1, wherein the pressure reducer comprises at least a flow restrictor.

5. The liquid treatment system of claim 1, further comprising an orifice fluidly coupled to the outlet of the liquid conditioning module and the bypass flow outlet, the orifice configured to control flow rates or pressures of the treatment solution flowing out of the bypass flow path and into the main flow path independent of the pressure reducer.

6. A liquid conditioning module comprising:
   an inlet configured to fluidly couple to a bypass flow inlet;
   a reservoir holding one or more treatment components, to be added to liquid entering the reservoir from a bypass flow path via the inlet to form a treatment solution to flow into a main flow path via a bypass flow outlet, the treatment solution as formed when liquid is added to the reservoir having a treatment concentration that varies along a depth of the reservoir such that the treatment solution has a desired treatment concentration in the reservoir at a particular depth;
   an outlet fluidly coupled to the reservoir and configured to fluidly couple to the bypass flow outlet; and
   a drop tube system comprising
      a hollow tube having a first tube end having a weight, the weight adapted to freely suspend the first tube end in the reservoir at the particular depth between an upper surface and a bottom surface of the reservoir corresponding to a treatment layer having the desired treatment concentration in the reservoir, the drop tube system configured to adjust a suspended position of the first tube end from a position near the upper surface of the reservoir to a position near the bottom surface of the reservoir to maintain the first tube end suspended in the treatment layer having the desired treatment concentration as the treatment layer having the desired treatment concentration moves toward the bottom surface of the reservoir during use, and
      a second tube end fluidly coupled to the outlet of the liquid conditioning module through which the treatment solution flows out of the reservoir toward the main flow path.

7. The liquid conditioning module of claim 6, wherein the treatment layer having the desired treatment concentration is toward the upper surface of the reservoir when the treatment component is at a predetermined maximum value in the reservoir.

8. The liquid conditioning module of claim 6, wherein the treatment layer having the desired treatment concentration moves toward the bottom surface of the reservoir when the treatment component forms the treatment solution and dispensed into the main flow path.

9. A liquid conditioning module comprising:
   an inlet configured to fluidly couple to a bypass flow inlet;
   a reservoir holding one or more treatment components, to be added to liquid entering the reservoir from the bypass flow path via the inlet to form a treatment solution to flow into the main flow path via a bypass flow outlet, the treatment solution as formed when liquid is added to the reservoir having a treatment concentration that varies along a depth of the reservoir such that the treatment solution has a desired treatment concentration in the reservoir at a particular depth;

an outlet fluidly coupled to the reservoir and configured to fluidly couple to the bypass flow outlet; and a drop tube system comprising:

a hollow tube having a first tube end having a weight, the weight adapted to freely suspend the first tube end in the reservoir at the particular depth between an upper surface and a bottom surface of the reservoir corresponding to a treatment layer having the desired treatment concentration in the reservoir, a second tube end fluidly coupled to the outlet of the liquid conditioning module through which the treatment solution flows out of the reservoir toward the main flow path, and a coarse filter fluidly coupled to the first tube end, and a fine filter fluidly coupled to the second tube end, the coarse filter having filter pore sizes greater than filter pore sizes of the fine filter.

10. The liquid conditioning module of claim 9, further comprising a wick fluidly coupled to the second tube end, at least one of the fine filter and the wick preventing air bubbles or from forming in the treatment solution flowing out of the outlet of the water conditioning module.

11. The liquid conditioning module of claim 6, further comprising a coarse filter fluidly coupled to the first tube end, and a fine filter fluidly coupled to the second tube end, the coarse filter having filter pore sizes greater than filter pore sizes of the fine filter.

12. The liquid conditioning module of claim 6, wherein the desired treatment concentration in the reservoir at the particular depth is the highest treatment concentration, and wherein the weight is adapted to maintain the first tube end suspended in the reservoir at the particular depth between the upper surface and the bottom surface of the reservoir corresponding to the treatment layer having the highest treatment concentration in the reservoir.

13. The liquid conditioning module of claim 6, wherein the weight is adapted to freely suspend the first tube end in the reservoir at the particular depth between the upper surface and the bottom surface of the reservoir corresponding to a suspended treatment layer in the reservoir.

14. The liquid conditioning module of claim 6, further comprising a filter fluidly coupled to the first tube end, wherein the weight is configured relative to the filter to maintain the filer at the first tube end in a horizontal position, relative to the treatment layer, within the liquid conditioning module.

15. The liquid conditioning module of claim 9, wherein the desired treatment concentration in the reservoir at the particular depth is the highest treatment concentration, and wherein the weight is adapted to maintain the first tube end suspended in the reservoir at the particular depth between the upper surface and the bottom surface of the reservoir corresponding to the treatment layer having the highest treatment concentration in the reservoir.

16. The liquid conditioning module of claim 9, wherein the weight is adapted to freely suspend the first tube end in the reservoir at the particular depth between the upper surface and the bottom surface of the reservoir corresponding to a suspended treatment layer in the reservoir.

17. The liquid conditioning module of claim 9, wherein the weight is configured relative to the coarse filter to maintain the coarse filer at the first tube end in a horizontal position, relative to the treatment layer, within the liquid conditioning module.

18. The liquid conditioning module of claim 1, wherein the desired treatment concentration in the reservoir at the particular treatment solution layer is the highest treatment concentration, and wherein the weight is adapted to maintain the first tube end suspended in the reservoir at the particular treatment solution layer between the upper surface and the bottom surface of the reservoir corresponding to the treatment solution layer having the highest treatment concentration in the reservoir.

19. The liquid conditioning module of claim 1, further comprising a filter fluidly coupled to the first tube end, wherein the weight is configured relative to the filter to maintain the filer at the first tube end in a horizontal position, relative to the particular treatment solution layer, within the liquid conditioning module.

20. The liquid conditioning module of claim 6, wherein the hollow tube is at least partially coiled when the first tube end is at the position near the upper surface of the reservoir.

* * * * *